(12) United States Patent
Milicevic et al.

(10) Patent No.: US 11,352,286 B2
(45) Date of Patent: Jun. 7, 2022

(54) METHOD, DEVICE, AND SYSTEM FOR HEATING AN ELONGATE SILICA CYLINDER IN MANUFACTURING OPTICAL FIBERS

(71) Applicant: Draka Comteq B.V., Delft (NL)

(72) Inventors: Igor Milicevic, Helmond (NL); Gertjan Krabshuis, Sint Oedenrode (NL); Mattheus Jacobus Nicolaas Van Stralen, Tilburg (NL)

(73) Assignee: Draka Comteq B.V., Delft (NL)

( * ) Notice: Subject to any disclaimer, the term of this patent is extended or adjusted under 35 U.S.C. 154(b) by 270 days.

(21) Appl. No.: 16/555,185

(22) Filed: Aug. 29, 2019

(65) Prior Publication Data

US 2020/0071223 A1 Mar. 5, 2020

(30) Foreign Application Priority Data

Sep. 3, 2018 (NL) .................................... 2021543

(51) Int. Cl.
*C03B 37/012* (2006.01)
*C03B 37/018* (2006.01)
*C03B 37/029* (2006.01)

(52) U.S. Cl.
CPC .. *C03B 37/01257* (2013.01); *C03B 37/01869* (2013.01); *C03B 37/029* (2013.01)

(58) Field of Classification Search
None
See application file for complete search history.

(56) References Cited

U.S. PATENT DOCUMENTS

| 9,120,694 B2 | 9/2015 | Enomoto et al. |
| 2002/0088253 A1 | 7/2002 | Roba et al. |
| 2002/0097774 A1 | 7/2002 | Simons et al. |
| 2003/0209039 A1 | 11/2003 | Breuls et al. |
| 2005/0000253 A1 | 1/2005 | Xie et al. |

(Continued)

FOREIGN PATENT DOCUMENTS

| EP | 2727888 A1 | 5/2014 | |
| JP | 55090435 A | * 7/1980 | ......... C03B 37/1869 |

(Continued)

OTHER PUBLICATIONS

JP2002-173333A EPO Machine Translation Performed on Sep. 12, 2021. (Year: 2021).*

(Continued)

*Primary Examiner* — Lisa L Herring
(74) *Attorney, Agent, or Firm* — Additon, Pendleton & Witherspoon, P.A.

(57) ABSTRACT

The invention relates to exemplary methods, devices, and systems for heating an elongate silica cylinder to form a core-rod for optical fibers. An exemplary heating device includes an elongate cavity, an elongate liner bounding the cavity, a heating element in a heating element space surrounding the liner, the liner separating the heating element space from the cavity, and a gas flushing device for effecting a flow of gas at least through the heating element space. An exemplary method includes providing the elongate silica cylinder such that it extends through the cavity, heating the cylinder locally beyond its softening temperature, and effecting a flow of argon and nitrogen gas during the heating.

12 Claims, 2 Drawing Sheets

(56) References Cited

U.S. PATENT DOCUMENTS

| | | | |
|---|---|---|---|
| 2007/0180862 A1* | 8/2007 | Takahashi | C03B 37/0146 65/484 |
| 2011/0100064 A1 | 5/2011 | Sarkar et al. | |
| 2014/0196505 A1* | 7/2014 | Enomoto | H05B 3/62 65/509 |
| 2015/0370008 A1* | 12/2015 | Tamura | C03B 37/01869 385/123 |

FOREIGN PATENT DOCUMENTS

| | | | | |
|---|---|---|---|---|
| JP | 59217641 A | * | 12/1984 | C03B 37/029 |
| JP | 061159668 A | * | 4/1994 | C03B 37/029 |
| JP | 2001064033 A | * | 3/2001 | C03B 37/01257 |
| JP | 2002173333 A | * | 6/2002 | C03B 37/029 |

OTHER PUBLICATIONS

JP59-217641A EPO Machine Translation Performed on Sep. 12, 2021. (Year: 2021).*
JP55-090435A EPO Machine Translation Performed on Sep. 12, 2021 (Year: 2021).*
JP06-115968 EPO Machine Translation Performed on Sep. 12, 2021 (Year: 2021).*

* cited by examiner

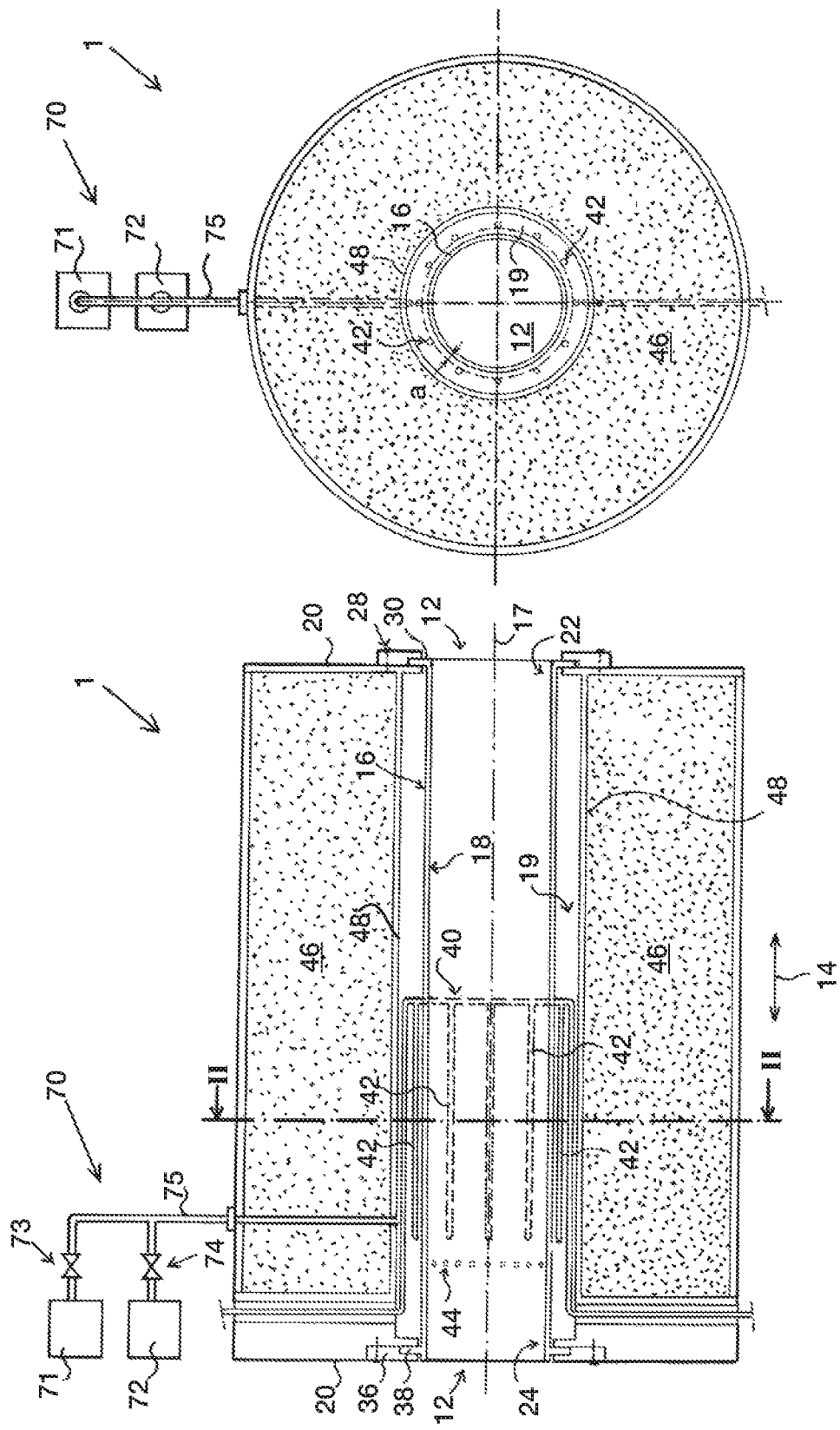

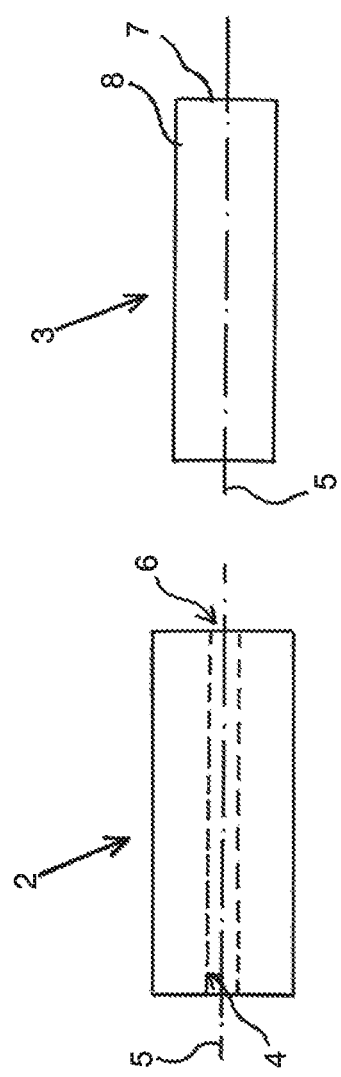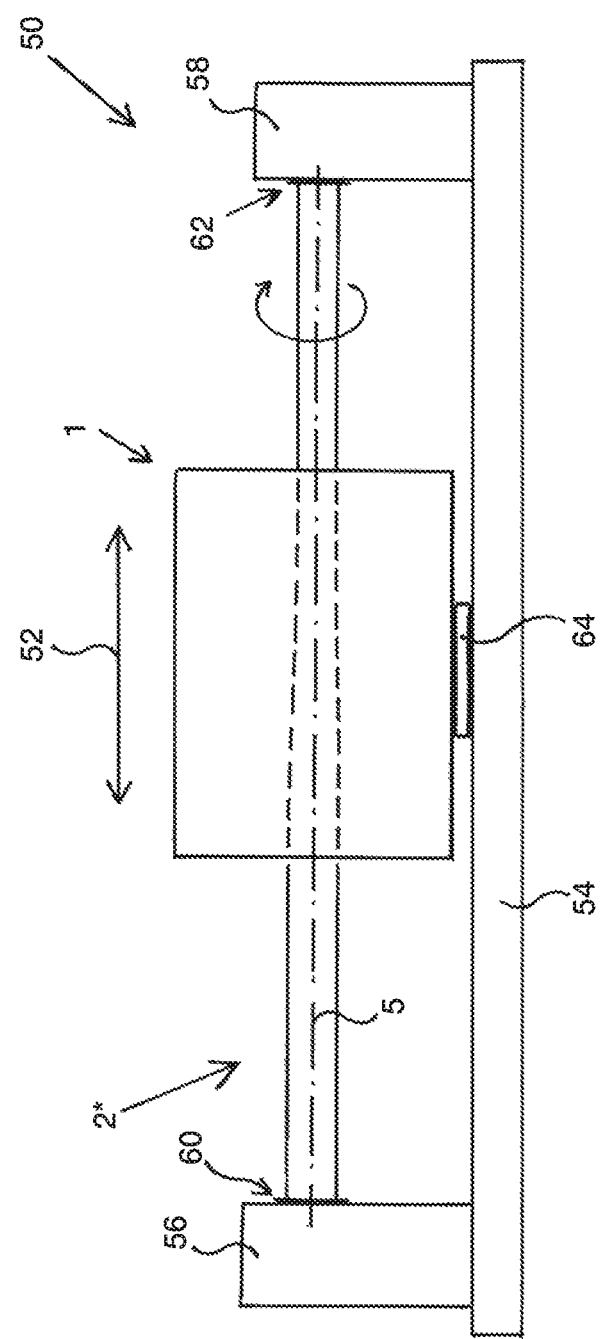

METHOD, DEVICE, AND SYSTEM FOR HEATING AN ELONGATE SILICA CYLINDER IN MANUFACTURING OPTICAL FIBERS

CROSS-REFERENCE TO PRIORITY APPLICATION

This application claims the benefit of pending Dutch Application No. 2021543 (filed Sep. 3, 2018, at the Netherlands Patent Office), which is hereby incorporated by reference in its entirety.

FIELD OF THE INVENTION

The present invention relates to a method, device, and system for heating an elongate silica cylinder for use in the manufacturing of optical fibers.

BACKGROUND

U.S. Patent Publication No. 2002/0097774 A1, which is hereby incorporated by reference in its entirety, relates to a device for manufacturing a preform, wherein a carrier tube is collapsed to a preform. The device comprises a heating element forming a cylindrical envelope, a carrier tube within the envelope, the heating element being movable in an axial direction with respect to the carrier tube, and means for supplying a non-oxidizing gas to the space between the carrier tube and the envelope. In use of the device, the space between the envelope and the carrier tube is flushed with a non-oxidizing gas.

U.S. Patent Publication No. 2003/0209039 A1, which is hereby incorporated by reference in its entirety, relates to a method for producing a preform for an optical fiber. One or more quartz layers are deposited on the internal surface of a quartz glass support tube. A furnace is moved axially with respect to the support tube. After the quartz layers have been deposited, the support tube is contracted into a bar-shaped preform while being heated, wherein the support tube is rotated. The space between the rotating support tube and the furnace is washed with an inert gas during contraction of the support tube.

U.S. Patent Publication No. 2002/0088253 A1, which is hereby incorporated by reference in its entirety, relates to a method for drawing an optical preform of large diameter into an optical fiber or into a preform of smaller diameter, comprising introducing the optical preform into a drawing furnace through a top chimney connected to the furnace; mechanically sealing the upper portion of the top chimney; heating the bottom end of the preform into the furnace to its softening temperature; and introducing a flow of conditioning gas into the top chimney.

U.S. Patent Publication No. 2011/0100064 A1, which is hereby incorporated by reference in its entirety, relates to a method for making an optical fiber core rod comprising providing a cylindrical silica glass preform having a central aperture extending along its length; closing one end of the preform's central aperture; sintering the silica glass preform while directing sintering gases through the preform's central aperture; and elongating the sintered silica glass preform while drawing a vacuum in the preform's central aperture to yield a dense core rod suitable for use in making optical fibers.

U.S. Patent Publication No. 2005/0000253 A1, which is hereby incorporated by reference in its entirety, relates to a method of reducing the hydroxyl content of an optical fiber preform for manufacturing a low water peak, single mode fiber, in which an optical fiber preform is produced by means of plasma chemical vapor deposition with adjusting process parameters and controlling raw material and environmental factors.

European Patent Publication No. 2727888, and its counterpart U.S. Pat. No. 9,120,694, each of which is hereby incorporated by reference in its entirety, relates to a furnace for glass base material. The glass preform heating furnace is equipped with a susceptor to which a glass preform is supplied; a slit heater in which slits are cut in a cylindrical member enclosing the susceptor from the upper and lower ends of the cylindrical member alternately; an insulator enclosing the exterior of the slit heater; and a furnace body enclosing the whole.

In such heating devices, or heating furnaces, an inert gas like argon or helium is used to flush the furnace so as to protect furnace elements like the susceptor, or liner, from burning or corrosion.

For limiting loss of energy, it is preferred that the heating element—generally of the resistive type—is placed close to the liner. The high temperatures required to heat the cylindrical glass tubes (e.g., quartz tubes) and the required electric current for the heating element may cause ionization of the flushing gas and arching between the heating element and liner. This results in a leak of energy, which may be significant, and results in an erosion of the heating element and liner, which changes the energy balance of the heating device and causes a drifting of the process. Furthermore, at the location where such ionization and/or arching occurs, damage to elements of the device may occur.

SUMMARY

The present invention relates to a method, device, and system for heating an elongate silica cylinder for use in the manufacturing of optical fibers. The method typically includes collapsing an elongate hollow silica cylinder, such as a tube, comprising deposited layers of silica on at least part of its inner surface to form a core-rod for optical fibers.

Accordingly, the present teaching embraces the field of manufacturing optical fibers by means of chemical vapor deposition (CVD) in which layers of silica are deposited on a substrate. Exemplary processes are modified chemical vapor deposition (MCVD), plasma-enhanced chemical vapor deposition (PECVD or PCVD), and outside vapor deposition (OVD).

A tube having deposited layers of silica, such as by means of PCVD, may be transferred to a heating device for forming a core-rod by means of heating the silica tube. Such a device is also called a collapsing lathe, or a glass-working lathe. The function of the collapsing is to form a core-rod from the tube. While a tube having the deposited layers of silica still has a central through hole, the core-rod does not. This is a result of locally heating the tube beyond its melting temperature. When the silica starts to melt, the tube assumes a smaller diameter due to surface tension. This local heating process is carried out until the central hole in the tube is totally closed; then the forming of the core-rod is completed. During the heating, the device and the tube move in reciprocating manner along each other so that the device heats the tube locally, but over time along the entire length of the tube.

It is an exemplary object of the present invention to provide a solution for the problems discussed above.

It is an exemplary object of the present invention to provide an improved heating method and device for heating an elongate silica cylinder for use in the manufacturing of optical fibers.

It is an exemplary object of the present invention to provide a heating method and device for heating an elongate silica cylinder for use in the manufacturing of optical fibers, the method and device being stable and reliable over time, and/or the method and device having increased efficiency.

In an exemplary aspect, the present invention relates to a method for heating an elongate silica cylinder for use in the manufacturing of optical fibers. The method typically includes collapsing an elongate hollow silica cylinder (e.g., a tube), comprising deposited layers of silica on at least part of its inner surface to form a core-rod for optical fibers. An exemplary method for heating includes:

providing a heating device comprising:
    an elongate cavity extending in an axial direction of the device, arranged to allow a cylinder (e.g., an elongate cylinder) to extend through the cavity in use,
    an elongate cylindrical liner having a cylindrical wall, the liner being made of carbon, extending in the axial direction and bounding the cavity with the cylindrical wall,
    a heating element for heating the elongate silica cylinder in use, the heating element being provided in an annular heating element space, the heating element surrounding at least a part of the liner, the cylindrical wall of the liner separating the heating element space from the cavity, the heating element space on an outer side bounded by a further surrounding wall part of a frame portion of the device, and
    a gas flushing device for effecting a flow of a gas at least through the heating element space,
providing the elongate silica cylinder such that it extends through the cavity of the heating device,
heating the elongate silica cylinder locally beyond its softening temperature by means of generating heat using the heating element of the heating device, and
effecting the flow of the gas at least through the heating element space by means of the gas flushing device during the heating step, wherein the flow of gas comprises at least argon gas and nitrogen gas.

In further exemplary aspects the invention relates to a heating device and a system, respectively, for heating such an elongate silica cylinder, typically for use in an exemplary method according to the invention.

An effect of the method according to the invention is that, by providing the flow of the gas at least through the heating element space by means of the gas flushing device during the heating step, wherein the flow of gas comprises at least argon gas and nitrogen gas, the aforementioned problems including arching between the heating element and the liner and leak current are obviated or at least significantly reduced. This is particularly so when a relatively small amount of nitrogen, such as disclosed below, is added to the argon flushing gas.

In an exemplary embodiment, the silica is vitrified silica. In another exemplary embodiment, the silica is non-vitrified. In another exemplary embodiment, the elongate silica cylinder comprises both layers of vitrified silica and layers of non-vitrified silica.

The amount of nitrogen is typically below 5 percent to prevent pollution, which may be present in commercial grade nitrogen, from depositing on the heating device parts.

For the purpose of the local heating of the silica cylinder, the cylinder and the heating device may be moved with respect to each other in a reciprocating manner in the axial direction of the cylinder. For this purpose, in an exemplary embodiment, the heating device may have a moving device having two holding elements for holding two opposed end portions of the cylinder. The moving device may further be configured for moving the heating device in a reciprocating manner in the axial direction, such that the heating device passes along the cylinder during execution of the method. This way, the cylinder is heated only locally wherein a heated zone of the cylinder moves along the length of the cylinder because of the reciprocating movement.

During the heating step, the elongate silica cylinder is heated locally beyond the softening temperature (e.g., to a temperature of at least the softening temperature or to a temperature above the softening temperature) by means of generating heat using the heating element of the heating device.

Described effects of the method of the invention are applicable to the heating device and system of the invention in an analogous manner, and vice versa.

Exemplary embodiments of the present invention are disclosed in the appended claims and the following description of embodiments. Corresponding embodiments of the method disclosed below are also applicable for the heating device and system according to the present invention and vice versa.

Definitions

The following definitions are used in the present description and claims to define the stated subject matter. Other terms not cited below are meant to have the generally accepted meaning in the field.

"collapsing" as used in the present description means contracting a tube by locally heating the tube beyond the melting temperature, so that a central through hole of the tube closes and the outer diameter of the tube reduces.

"core-rod" as used in the present description means a solid rod that is obtained by collapsing a tube and that comprises, from the center to the periphery, at least an optical core and an optical cladding.

"preform" or "final preform" as used in the present description means an elongate cylindrical silica glass structure that can be directly used for drawing of optical fibers therefrom, the elongate cylindrical silica glass structure being a core-rod or a core-rod surrounded by one or more concentric silica glass tubes or with additional silica deposited on the outer cylindrical circumference of the core-rod.

"silica" as used in the present description means: any substance in the form of $SiO_x$, whether or not stoichiometric, and whether or not crystalline or amorphous. The silica may be non-vitrified or vitrified silica.

"non-vitrified silica" or "soot" as used in the present description means incompletely vitrified (e.g., not or partly vitrified) silica. It can be either undoped or doped.

"vitrified silica" or "silica glass" as used in the present description means: a glassy substance produced by the vitrification of silica. It can be either undoped or doped. Undoped vitrified synthetic silica is also known as fused quartz or fused silica, has a high purity, and consists mainly of amorphous $SiO_2$; it may comprise chlorine in an amount of up to 1500 ppm and still be considered to be undoped. Vitrified natural silica is prepared from natural silica particles or powder and comprises several impurities.

The foregoing illustrative summary, as well as other exemplary objectives and/or advantages of the invention, and the manner in which the same are accomplished, are further explained within the following detailed description and its accompanying drawings.

BRIEF DESCRIPTION OF THE DRAWINGS

The present invention is described hereinafter with reference to the accompanying highly schematic drawings in which exemplary embodiments of the present invention are shown and in which like reference numbers indicate the same or similar elements.

FIG. 1 shows an exemplary embodiment of a heating device according to the present invention, in longitudinal cross-section;

FIG. 2 shows section II-II of the exemplary device of FIG. 1;

FIG. 3a shows a typical example, drawn shortened, of a tube which may be collapsed using a device according to the present invention;

FIG. 3b shows a typical example, drawn shortened, of a core-rod which may have been formed by collapsing, using a device according to the present invention, of the tube of FIG. 3a; and FIG. 4 shows, in front view, an embodiment of a system according to the present invention, comprising the device of FIG. 1.

DETAILED DESCRIPTION

As described above, in an exemplary aspect, the invention relates to a method for heating an elongate silica cylinder for use in the manufacturing of optical fibers. Several exemplary embodiments of the method and of a heating device and system for use in the method are discussed below.

In an exemplary embodiment, in the flow of the gas (e.g., during the heating step), the nitrogen gas is present in a volumetric amount in the range of 0.2 percent to 20 percent, typically in the range of 0.25 percent to 10 percent, more typically in the range of 0.25 percent to 5 percent (e.g., between about 0.5 and 1 percent). Typically, in the flow of the gas, argon gas is present having a volumetric flow rate that is larger than the volumetric flow rate of the nitrogen gas by a factor in the range of 5 to 500, typically in the range of 10 to 400, more typically in the range of 20 to 400 (e.g., between about 100 and 200). In an exemplary embodiment, a flow of the gas at least through the heating element space may be effected in which the flow of nitrogen is about $3 \times 10^{-6}$ m$^3$/s (0.2 slm—standard liter per minute) and the flow of argon is about $5 \times 10^{-4}$ m$^3$/s (30 slm—standard liters per minute).

In an exemplary embodiment, during the heating step, the cylinder is, at least locally, heated to a temperature of above 1800° C. (e.g., 1900° C. or 2000° C.), and typically at most to about 2300° C.

In an exemplary embodiment, the liner comprises several through holes in the cylindrical wall, via which holes the gas flows from the heating element space to the cavity during the step of effecting the flow of the gas. Typically, the volumetric flow rate of the gas relative to a combined size of the through holes is configured such that a positive pressure, typically at a level slightly above atmospheric pressure, such as between 1.1 bar and 1.5 bar (e.g., about 1.15 bar), builds up inside the heating element space during use.

In an exemplary embodiment, the method comprises a device preheating step during which the heating element is heated to a temperature suitable for performing the heating step, wherein during the preheating step a flow of the gas is effected by means of the gas flushing device. For example, the flow of gas comprises at least argon gas and nitrogen gas, wherein, in the flow of the gas, a volumetric flow rate of the argon gas is larger than a volumetric flow rate of the nitrogen gas by a factor of about 1 to 1000 (e.g., 50 to 400), such as between about 2 and 500 (e.g., 75 to 250). In an exemplary embodiment, the volumetric flow rate of the argon gas is larger than the volumetric flow rate of the nitrogen gas by a factor of 5 to 100, such as 10 to 100 (e.g., about 20 to 40). Typically, during the preheating step, the relative amount of the nitrogen gas in the resulting gas (e.g., the argon-nitrogen mixture) is larger than during the subsequent heating step, typically by a factor of about 5. As such, the volumetric ratio of argon gas to nitrogen gas is about 5× greater during the heating step than during the preheating step (e.g., 4× to 6× greater). In an exemplary embodiment, the volumetric flow rate of argon may be essentially constant during the preheating and heating steps, but the volumetric flow rate of the nitrogen gas decreases significantly (e.g., to one fifth or so) after the preheating step. In other exemplary embodiments, the volumetric ratio of argon gas to nitrogen gas is about 2× to 10× greater (e.g., 3× to 8× greater) during the heating step than during the preheating step.

In an exemplary embodiment, the heating element is of the resistive type and the step of heating the cylinder, and if applicable additionally the step of preheating the cylinder, is performed by providing electric power to the heating element.

In an exemplary aspect, the invention relates to a heating device for heating an elongate silica cylinder, typically for use in a method according to the present invention. The device is configured for use in the manufacturing of optical fibers, typically to form a core-rod for optical fibers for which purpose the device is arranged for collapsing the cylinder (which may be in the form of a tube comprising deposited layers of silica) to form the core-rod. An exemplary heating device comprises:

an elongate cavity extending in an axial direction of the device, arranged for allowing the elongate silica cylinder to extend through the cavity in use;

an elongate cylindrical liner made of carbon, extending in the axial direction and bounding the cavity with a cylindrical wall thereof; and a heating element for heating the elongate silica cylinder (e.g., a tube) in use, the heating element being provided in an annular heating element space, the heating element surrounding at least a part of the liner, the cylindrical wall of the liner separating the heating element space from the cavity.

In an exemplary embodiment, the heating device further has a gas flushing device for effecting a flow of a gas comprising at least argon and nitrogen at least through the heating element space.

In an exemplary embodiment of the heating device, the liner comprises several through holes in the cylindrical wall, via which holes the gas flows from the heating element space to the cavity in use of the heating device, during the step of effecting the flow of the gas. Further, the heating element may be of the resistive type.

The heating element may be made of graphite and/or may comprise a plurality of meandering elongate parts, or "fingers" along a part of the length of the liner.

The heating element typically is free from the liner and leaves a radial gap with an outer surface of the liner in the range of 4 millimeters to 9 millimeters, typically in the range of 5 millimeters to 7 millimeters. It is noted in this respect that, seen in cross section, an inner diameter of the heating element is defined by an inscribed circle of the fingers of the heating element if the heating element comprises such a plurality of fingers, which are typically evenly distributed in the circumferential direction.

Typically, the heating device further comprises a source of argon and a source of nitrogen, and further comprises respective valve elements for enabling a flow of argon and nitrogen, respectively, from the respective sources to the heating element space, and comprises a regulating element for regulating the flow of argon relative to the flow of nitrogen. The regulating element may be integrated or be formed by one or more of the valve elements. An argon supply line and a nitrogen supply line, operatively connected to the respective sources, may individually emerge into the heating element space or may be joined upstream so that the argon and nitrogen flows via a common supply line to the heating element space.

Alternatively, the heating device may comprise a source of a mixture of argon and nitrogen and may comprise a valve element for enabling and optionally regulating a flow of the gas comprising argon and nitrogen from the source to the heating element space.

In an exemplary aspect, the invention relates to a system for heating an elongate silica cylinder, typically for use in an above-described method according to the invention, the system being for use in the manufacturing of optical fibers. An exemplary system comprises a heating device according to the invention as described above. The system may further comprise a moving device configured for moving the cylinder and the heating device with respect to each other in a reciprocating manner in the axial direction.

To this end, the moving device may have two holding elements for holding two opposed end portions of the cylinder, wherein the moving device is configured for moving the heating device in a reciprocating manner in the axial direction, such that the heating device passes along the cylinder in use of the system. The two holding elements may be formed by two respective rotatable chucks configured for holding and rotating the cylinder in use of the system, during execution of the method.

FIG. 1 shows a heating device 1 for use in the above method according to the invention. The device 1 in use heats an elongate silica cylinder, such as to collapse the cylinder to form an elongate core-rod 3 for optical fibers. The core-rod 3 is cylindrical with a central axis 5 defining its axial direction and is formed from an elongate tube 2 having a plurality of concentric silica layers 4, which may have been obtained by deposition. Such a tube 2 is shown in FIG. 4. In FIG. 3a, the length of the tube 2 has been drawn shortened (i.e., it is not to scale). In practice, the tube may have a length of over 1 meter, such as in the range of 1 to 5 meters (e.g., about 2 or 2.25 or 2.5 meters), and may have an outer diameter in the range of 20 to 150 millimeters, such as about 45 millimeters. Generally, the tube may be longer in case of larger diameters. Similarly, in FIG. 3b, the length of the core-rod 3 has been drawn shortened. In practice, the core-rod 3 has a shorter length than the tube 2 from which it is formed (unless it is elongated during or after the collapsing) and has a reduced outer diameter of about 35 millimeters in case of a tube diameter of 45 millimeters, for example. In another example, in case of a tube diameter of 80 millimeters, the core-rod diameter may be about 60 millimeters. While the tube 2 has a cavity within (i.e., a central through hole 6), the core-rod 3 is a solid rod (i.e. it does not have a cavity/central through hole any longer). The core-rod 3 is obtained by collapsing the tube 2 using the heating device 1. The core-rod 3 comprises from the center to the periphery at least an optical core 7 and an optical cladding 8.

The device 1 is arranged for heating a tube 2 in order to collapse the tube 2 to form the core-rod 3. To this end, the device 1 comprises an elongate cavity 12 extending in an axial direction 14 of the device 1. The cavity 12 is arranged for allowing the tube 2, which is to be heated and thereby collapsed so as to form a core-rod 3, to extend through the cavity 12 in use. The cavity 12 thus extends through the device 1 and forms a passage through the device. A length of the device 1 (i.e., the dimension of the device extending in the axial direction 14) is smaller than the length of the tube 2 to be collapsed. The length, or better, overall scale of the device is related to the dimensions of the tube to be heated and collapsed. The length of the device may be in the range of 150 to 600 millimeters, such as about 400 millimeters for a tube of about 1.5 to 3 meters, such as the tube 2 mentioned above. The length of the tube may be more than 1 meter, or even more than 2 meters as also mentioned above.

The heating device 1 also has an elongate cylindrical liner 16 made of carbon, more specifically graphite, having a central axis 17. The liner 16 extends in the axial direction 14 and bounds the cavity 12 with a cylindrical wall 18 thereof. The liner 16 may have a length to inner diameter ($l/d_i$) ratio in the range of 3 to 10, typically 6 to 7. That is, the length is 3 to 10 (or 6 to 7) times the inner diameter. For some tubes, such as the tube 2 described above, the inner diameter of the liner may be chosen such that there is a gap (e.g., an annular gap) between the tube and the cylindrical wall 18 of the liner 16 of about 2 to 10 millimeters, typically of about 3 to 4 millimeters. For the above-described tube of 45 millimeters the inner diameter of the liner 16 may be 52 millimeters (thus leaving a gap of 3.5 millimeters), and the length may be about 350 millimeters. The wall thickness of the cylindrical wall 18 of the liner 16 may be between 2 and 10 millimeters, such as about 4 millimeters, for example.

The liner 16 has been connected to a frame 20 of the device at opposing end portions 22, 24 of the liner by means of ring-shaped clamps 28 and 36, clampingly engaging respective flanges 30 and 38 provided on the first and second end portions 22 and 24 of the liner 16, respectively. As a result, the liner 16 is clamped to the frame 20 of the device 1. At the first and/or second end portion, a protection and heat dissipation sleeve (not shown) may be provided, partially protruding to inside the cavity and having an outer diameter about equal to an inner diameter of the liner. In order to allow elongation of the liner during use, as a result of the elevated temperature in use of the heating device 1, the clamp 28 engages the flange 30 in a spring-loaded manner (spring not shown in FIG. 1). A spring-loaded connection of the liner to the frame may alternatively be provided at the other end portion 24 of the liner, by means of a spring provision between the clamp 36 and the flange 38 of the liner, or may be provided at both end portions 22, 24 of the liner. The invention is not limited to the above-described specific manners of connection of the liner to the frame.

The heating device 1 also comprises a heating element 40 surrounding at least a part of the liner 16 in an axial direction. The heating element 40 is of the resistive type and provided in an annular space 19 surrounding the liner 16. Typically, the heating element is made of graphite and comprises a plurality of meandering elongate parts, or "fingers," along a part of the length of the liner, thereby realizing a plurality of elongate heating element parts 42 formed by the "fingers," each part 42 extending in an axial direction. The heating element 40 can thus said to be provided concentrically about the liner 16; that is, it can uniformly heat the tube 2 inside the cavity 12 for the purpose of collapsing it to form the core-rod 3. The cylindrical wall 18 of the liner separates the heating element space 19 from the through cavity 12. The heating element 40 is free from the liner 16, and its inner diameter leaves a radial gap "a" with an outer surface of the liner 16 of about 6 millimeters, as shown in FIG. 2. It is noted in this respect that an inner diameter of the heating element 40 is defined by an inscribed circle (partially drawn in FIG. 2) of the finger shaped element parts 42 of the heating element 40, also as shown in FIG. 2.

The heating device 1 further has a gas flushing device 70 for effecting a flow of a gas at least to the heating element space 19. According to the invention, the gas comprises at least argon and nitrogen. That is, the gas is a mixture comprising at least argon and nitrogen. The gas flushing device 70 has a source of argon and a source of nitrogen, in the form of respective reservoirs 71, 72, and further comprising respective valve elements 73, 74 in respective supply lines from the reservoirs 71, 72 for enabling a flow of argon and of nitrogen, respectively from the respective reservoirs 71, 72 to the heating element space 19 via a common supply line 75 downstream of the valves 73, 74. The common supply line extends through the heating device insulation material 46. Multiple supply lines may be provided, each debouching into the heating element space, for distributing the supply of the gas to the heating element space to a larger extent. Respective lines from the valve elements 73, 74 are joined such as by a T-junction as shown in FIG. 1. The valve elements 73, 74 are provided as flow regulating valves (flow control valves) and thus jointly form a regulating element for regulating the flow of argon relative to the flow of nitrogen. Common supply line 75 may at least for a part thereof be flexible such that the reservoirs may be provided stationary and the mentioned reciprocating movement of the heating device 1 in use during heating is not obstructed by the supply line 75. Other valve-regulating elements and flow-line configurations are possible within the scope of the present disclosure, for example including an embodiment in which an argon supply line and a nitrogen supply line individually debouch into the heating element space 19. In an alternative embodiment, the gas, being an argon-nitrogen mixture, may be supplied from a single external reservoir into the heating element space 19.

The liner 16 comprises several through holes 44 in the cylindrical wall, via which through holes 44 the gas flows from the heating element space 19 on an outer side of the liner 16 to the cavity 12 bounded by the cylindrical wall 18 of the liner 16. On both ends of the cavity 12 (i.e., at the opposing end portions 22, 24 of the liner 16), the gas flows from the heating device 1 into the surrounding space. By doing so, oxygen is prevented from entering and being present inside the cavity 12. As a result, undesired deterioration, such as burning of the graphite parts in the device 1, is prevented. By providing the flow of the gas mixture of argon and nitrogen by means of the gas flushing device 70 during the heating step, potential problems including arching and leak current as mentioned above are obviated or at least significantly reduced. This is particularly so when a relatively small amount of nitrogen relative to argon, typically a nitrogen amount of less than about 5 percent, is present in the gas. The clamping connection between the liner and the frame is gas-tight, such as by means of the above-described clamps 28, 36 clampingly engaging flanges 30, 38 of the liner 16, possibly in a spring-loaded manner. The heating element space 19 is bounded on its outer side by a cylindrical wall portion 48. On the outside of this wall portion 48, insulating material 46 is provided.

The above-described heating device 1 may form part of a system 50 for heating an elongate silica cylinder, such as for forming a core-rod 3 for optical fibers. The system 50 is arranged for collapsing a tube 2 having deposited layers of silica 4, to form the core-rod 3 in use. As depicted in FIG. 4, the system further has a frame 54 onto which two holding elements 56, 58 comprising chucks 60, 62 are provided, of which at least one may be rotatingly driven, the holding elements being configured for holding and jointly rotating about the central axis 5 of the tube. The tube 2 is placed into the system with the two opposed end portions of the tube 2 held by the holding elements. The tube may have extended end portions, which may be disposed of after the collapsing. The system further comprises a moving device 64, such as a spindle or linear drive, configured for moving, and more specifically translating, the heating device 1 in a reciprocating manner along the frame 54 in the axial direction 52. The tube is held by the holding elements such that it passes through the cavity 12 of the heating device 1, the central axis 5 of the tube 2 coinciding with the central axis 17 of the liner 16 of the heating device 1. Thus, the heating device 1 passes along the tube 2 in a reciprocating manner in use of the system 50.

In accordance with an exemplary method according to the invention for heating an elongate silica cylinder for use in the manufacturing of optical fibers, the method typically includes collapsing an elongate hollow silica cylinder (e.g., a tube) comprising deposited layers of silica on at least part of its inner surface to form a core-rod for optical fibers. The exemplary method includes these steps:

providing the heating device 1 as described above, comprising the elongated cavity 12, the elongate cylindrical liner 16, the heating element 40, and the gas flushing device 70;

providing the elongate silica cylinder in the form of the tube 2 comprising deposited layers of silica 4, such that it extends through the cavity 16 of the heating device 1. For this purpose, the tube 2 is held at two opposed end portions thereof;

heating the elongate silica cylinder (i.e., the tube 2) locally beyond the softening temperature thereof by means of generating heat using the heating element 40 of the heating device. For this purpose, the cylinder may be heated to about 2000° C.; and effecting the flow of the gas by means of the gas flushing device 70 at least during the heating step, wherein the flow of gas comprises at least argon gas and nitrogen gas. Because the liner 16 comprises several through holes 44 in the cylindrical wall 18 thereof, the gas flows from the heating element space 19 into the cavity 12.

In the flow of the gas, and at least in the present example, during the step of effecting the flow of gas, the nitrogen gas is present in a volumetric amount of about 0.7 percent and the argon in an amount of about 99.3 percent.

The method optionally comprises a device preheating step during which the heating element is heated to a temperature suitable for performing the heating step, wherein, during the preheating step, a flow of the gas is effected by means of the gas flushing device, wherein the flow of gas comprises at least argon gas and nitrogen gas, wherein, at least in the present example, the nitrogen gas is present in a volumetric amount of about 3 percent and the argon in an amount of about 97 percent.

During the step of heating, the tube 2 and the heating device 1 may be moved with respect to each other, using the moving means 64, such that the heating device 1 can pass along the tube 2 in a reciprocating manner. This may be done while rotating the tube using the at least one rotatable holding element. In FIG. 4, the tube which is being formed into a core-rod is indicated by reference sign 2*. On the left side of the device 1 in the view of FIG. 4, the diameter is still larger than on the right side of the device, thereby showing, only for the purpose of explaining an aspect of the invention, the process of gradually reducing the diameter of the tube so as to finally obtain the core-rod. While the device moves along the tube 2* to the left in FIG. 4, also the diameter of the tube 2* at that location will reduce.

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. A method for heating an elongate silica cylinder to form a core-rod for optical fibers, the method comprising:
    providing a heating device, comprising:
        an elongate cavity extending in an axial direction of the heating device, arranged for allowing an elongate silica cylinder to extend through the cavity while the heating device is in use,
        an elongate cylindrical liner having a cylindrical wall, the liner being made of carbon, extending in the axial direction and bounding the cavity with the cylindrical wall,
        a heating element for heating the elongate silica cylinder while the heating device is in use, the heating element being provided in an annular heating element space, the heating element surrounding at least a part of the liner, the cylindrical wall of the liner separating the heating element space from the cavity, the heating element space on an outer side bounded by a further surrounding wall part of a frame portion of the heating device, and
        a gas flushing device comprising one or more supply lines for effecting a flow of a gas at least through the heating element space;
    providing an elongate silica cylinder such that it extends through the cavity of the heating device;
    heating the elongate silica cylinder locally beyond its softening temperature by means of generating heat using the heating element of the heating device; and
    effecting the flow of the gas at least through the heating element space by means of the gas flushing device during the heating step, wherein the flow of gas comprises at least argon gas and nitrogen gas, wherein, in the flow of the gas, the nitrogen gas is present in a volumetric amount in the range of 0.2 percent to 20 percent.

2. The method according to claim 1, wherein the heating step comprises collapsing the elongate silica cylinder to form a core-rod for optical fibers.

3. The method according to claim 1, wherein, in the flow of the gas, the nitrogen gas is present in a volumetric amount in the range of 0.25 percent to 10 percent.

4. The method according to claim 1, wherein, during the heating step, the elongate silica cylinder is heated, at least locally, to a temperature of at least 1800° C.

5. The method according to claim 1, wherein the liner comprises several through holes in its cylindrical wall through which the gas flows from the heating element space to the cavity during the step of effecting the flow of the gas.

6. The method according to claim 1, comprising a device preheating step including heating the heating element to a temperature suitable for performing the heating step, wherein during the preheating step a flow of the gas is effected by means of the gas flushing device, wherein the flow of gas comprises at least argon gas and nitrogen gas, wherein, in the flow of the gas, a volumetric flow rate of the argon gas is larger than a volumetric flow rate of the nitrogen gas by a factor in the range of 5 to 100.

7. The method according to claim 6, wherein a volumetric ratio of argon gas to nitrogen gas is between 3× and 8× greater during the heating step than during the preheating step.

8. The method according to claim 1, wherein the step of heating the elongate silica cylinder includes providing electric power to a resistive heating element.

9. A method for heating and collapsing a hollow, elongate silica cylinder to form a core-rod for optical fibers, the method comprising:
    providing a heating device, comprising:
        an elongate cavity extending in an axial direction of the heating device, arranged for allowing an elongate silica cylinder to extend through the cavity while the heating device is in use,
        an elongate cylindrical liner having a cylindrical wall, the cylindrical liner being made of carbon, extending in the axial direction and bounding the cavity with the cylindrical wall,
        a heating element for heating the elongate silica cylinder while the heating device is in use, the heating element being provided in an annular heating element space, the heating element surrounding at least a part of the cylindrical liner, the cylindrical wall of the cylindrical liner separating the heating element space from the cavity, the heating element space on an outer side bounded by a further surrounding wall part of a frame portion of the heating device, and
        a gas flushing device comprising one or more supply lines for effecting a flow of a gas at least through the heating element space;
    providing an elongate silica cylinder such that it extends through the cavity of the heating device;
    heating the elongate silica cylinder locally beyond its softening temperature by means of generating heat using the heating element of the heating device;
    effecting the flow of the gas at least through the heating element space by means of the gas flushing device during the heating step, wherein the flow of gas comprises at least argon gas and nitrogen gas, wherein the nitrogen gas is present in a volumetric amount between 0.2 percent and 5 percent inclusively; and
    collapsing the elongate silica cylinder to form a core-rod for optical fibers.

10. The method according to claim 9, wherein, during the heating step, at least a portion of the elongate silica cylinder is heated to a temperature of at least 1800° C.

11. The method according to claim 9, wherein the cylindrical liner's cylindrical wall includes several through holes to facilitate gas flow from the heating element space to the cavity during the step of effecting the flow of the gas.

12. The method according to claim 9, comprising preheating the heating element to a temperature suitable for performing the heating step, wherein during this preheating step a flow of at least argon gas and nitrogen gas is effected by means of the gas flushing device, wherein the volumetric flow rate of the argon gas is larger than a volumetric flow rate of the nitrogen gas by a factor of between 10 and 100.

\* \* \* \* \*